United States Patent [19]

Yoshida

[11] 4,392,728
[45] Jul. 12, 1983

[54] CAMERA WITH FOCAL-PLANE SHUTTER HAVING CONTRAST CONTROL

[76] Inventor: Muneaki Yoshida, No. 2635, Kawaguchi Cho, Hachioji City, Tokyo, Japan

[21] Appl. No.: 381,944

[22] Filed: May 26, 1982

Related U.S. Application Data

[63] Continuation of Ser. No. 1,619, Jan. 8, 1979, abandoned.

[30] Foreign Application Priority Data

Jan. 11, 1978 [JP] Japan .................................. 53-1653

[51] Int. Cl.³ .............................................. G03B 7/08
[52] U.S. Cl. ....................................... 354/49; 354/56
[58] Field of Search .................... 354/23 R, 48, 49, 56

[56] References Cited

U.S. PATENT DOCUMENTS 4,104,654  8/1978  Maitani et al. .................... 354/56 X Primary Examiner—Michael L. Gellner
Attorney, Agent, or Firm—Weingram & Klauber

[57] ABSTRACT

A camera comprises a focal-plane shutter having a front curtain and a rear curtain. The front curtain comprises a center portion thereof being formed into a low reflection portion and a rear end portion being at least formed into a high reflection portion as compared with the center portion in the running direction of the front curtain.

7 Claims, 6 Drawing Figures

CAMERA WITH FOCAL-PLANE SHUTTER HAVING CONTRAST CONTROL

This is a continuation, of application Ser. No. 001,619 filed Jan. 8, 1979 now abandoned.

BACKGROUND OF THE INVENTION

The present invention relates to a camera which employs a TTL reflection metering system.

Heretofore, in this kind of cameras, in the surface of a first blind, i.e., a front curtain of a focal-plane shutter is formed a random number pattern for instance, its reflection power is set as well as that of a film surface, reflection light from the center portion of the front curtain or film is mainly measured, and proper exposure is determined.

If the whole front curtain is set at a uniform reflection power, however, when sky light of high brightness is incident such as outdoor photographing, this sky light has great influence upon measurement of reflection light on the front curtain and any proper exposure cannot be obtained.

Therefore, the reflection power at the front curtain portion incident by the sky light is deliberately lowered and any influence by the sky light is removed.

According to such means, however, the influence of the sky light can be removed but in case of an object of high brightness as a whole screen such as the seaside or skiing ground, a proper exposure is determined by the high brightness portion of the center portion of the screen, so that a shade portion of the object cannot be photographed because of an under exposure and it results in unnatural photographing.

SUMMARY OF THE INVENTION

An object of the present invention is to eliminate the above described disadvantages.

Another object of the present invention is to provide a camera employing a TTL reflection metering system for obtaining a good photographing effect inclusive of a shade portion in case of an object of high brightness by improving exposure characteristic of TTL reflection metering and making exposure higher in the object of high brightness than in an object of low brightness.

According to the present invention a camera comprises a focal-plane shutter having a front curtain and a rear curtain. The front curtain comprises a center portion thereof being formed into a low reflection portion and a rear end portion being at least formed into a high reflection portion as compared with the center portion in the running direction of the front curtain.

BRIEF DESCRIPTION OF THE DRAWING

FIG. 1 shows an outlined constructional view showing one embodiment of a camera which is applied the present invention to;

DESCRIPTION OF THE PREFERRED EMBODIMENTS

Figure 1:
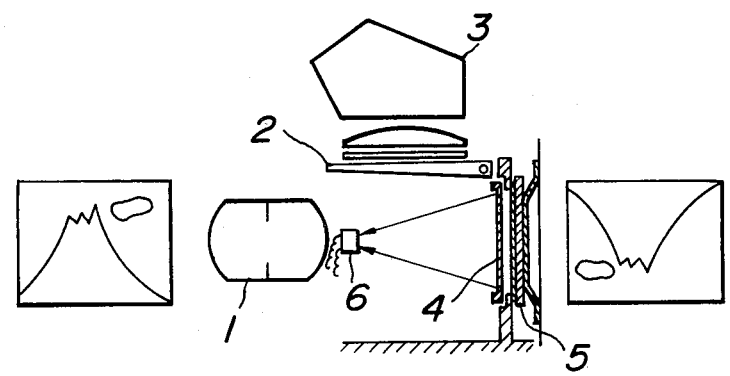

Referring now to the drawings, FIG. 1 shows the outlined construction of a camera which the invention is applied to. In FIG. 1, reference numeral 1 is a photographing lens, and on a light path for passing through the lens 1 is provided a finder optical system consisting of a pentaprism 3 and the like through a mirror 2 which is under the jump-up state in FIG. 1, and arranged with a film 5 through a shutter 4.

Figure 2:
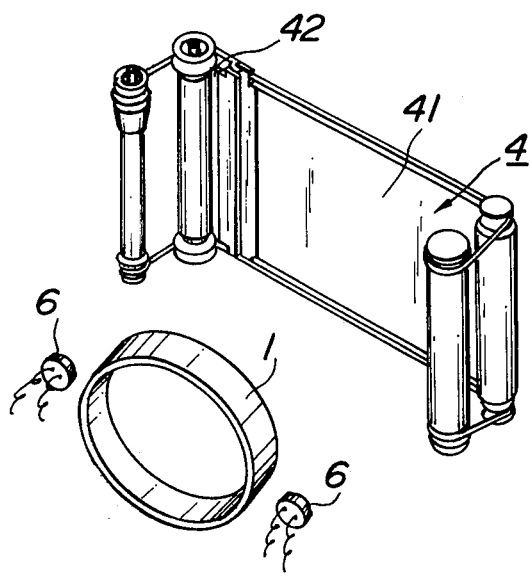
FIG. 2 is a perspective view of a focal-plane shutter used in the same camera.
Figure 3:
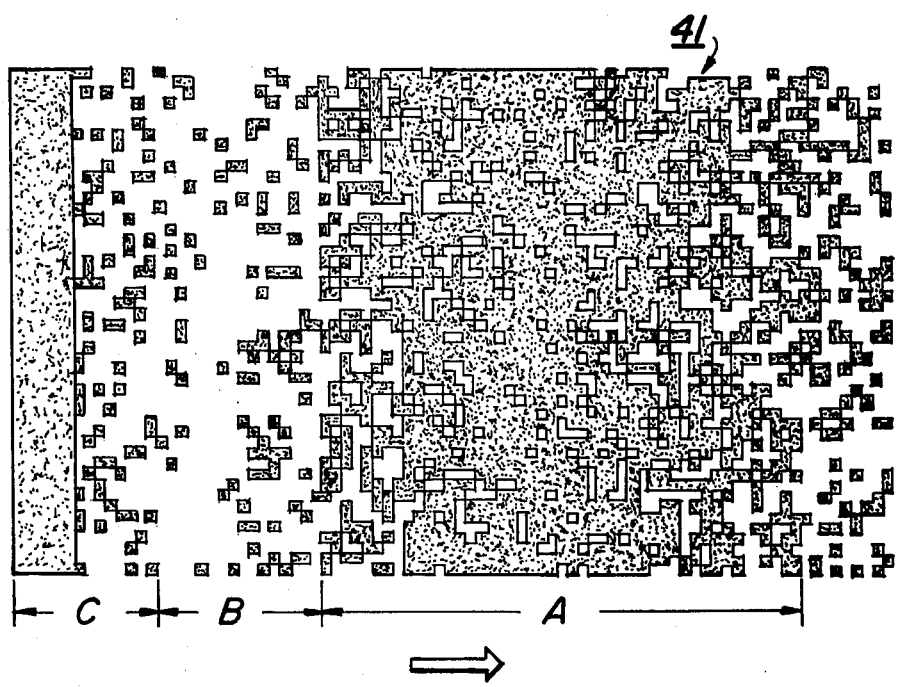
FIG. 3 is an explanatory view showing one embodiment of a pattern formed on the front curtain of the shutter of the same camera.
Figure 6:
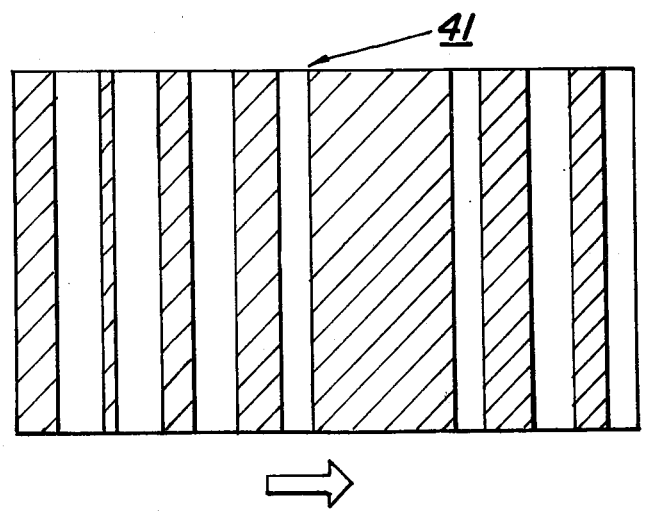
FIG. 6 is an explanatory view showing another embodiment of a pattern formed on the front curtain of the shutter.

In this case, the shutter 4 consists of a known focal-plane shutter provided with a front curtain 41 and a rear curtain 42 as shown in FIG. 2. On the surface toward the photographing lens 1 of the front curtain 41 is formed a random number pattern as shown in FIG. 3 so as to set a predetermined reflection power.

In the face of the shutter 4 is provided a light receiving element 6 consisting of a silicon photo diode and the like. The light receiving element 6 is for measuring reflection light from the front curtain 41 accompanied with the start of the front curtain 41 of the shutter 4, thereby determining an integral value of a light measuring circuit (not shown) and obtaining proper exposure by running the rear curtain 42 when the integral value reaches a predetermined value.

The random number pattern formed on the front curtain 41 of the shutter 4 will be explained hereinunder. That is, this random number pattern, as apparent from FIG. 3, secretly forms a black point of a low reflection power at the center portion of the front curtain 41 and further forms a low reflection portion A when the running direction of the front curtain 41 is made an arrow direction as illustrated, and further forms the left rear end portion as a high reflection portion B as compared with the center portion against the running direction. The reason why the right end portion of the front curtain 41 is made comparatively high reflection portion is because a total reflection power of the center portion must be a predetermined one. Further, the rear end forms a preliminary running portion C of the front curtain 41 and a tap portion is used as a low reflection portion for preventing stray light to the film.

Figure 4:
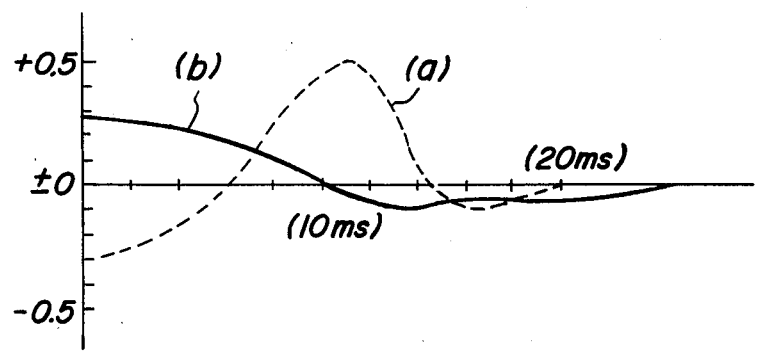
FIGS. 4 and 5 are graphs for explaining the same embodiment.
Figure 5:
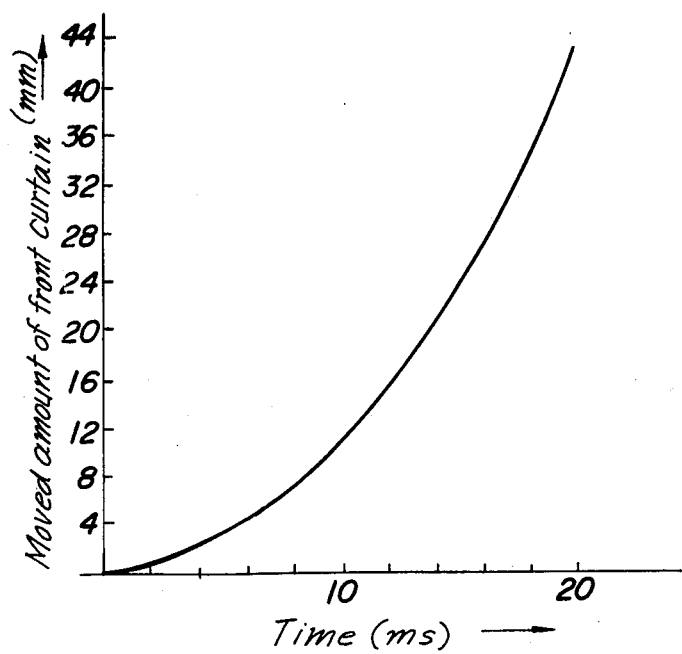

Therefore, if the running characteristic of the front curtain 41 of the shutter 4 is as shown in FIG. 5, the total reflection power of the front curtain 41 positioned at the center portion of the screen is varied as shown in FIG. 4a, thereby obtaining an integral value shown in FIG. 4b as an exposure correction value by the light receiving element 6 and a light measuring circuit (not shown).

According to such construction, in case of an object of extremely high brightness such as the seaside, skiing ground and the like, the integral value of the light measuring circuit reaches a predetermined value by the exposure correction value shown in FIG. 4b by means of the low reflection portion A of the front curtain 41 of the shutter 4 and slightly delays until the rear curtain 42 starts its running. In case of FIG. 4, therefore, the exposure can automatically be over around 0.2–0.3 EV, and as a result, even in case of an object of high brightness, a good photographing result inclusive of a shade portion. In this case, in order to have an overexposure, no correction means is added to the light measuring circuit at all, so that the circuit does not become complicated and it is economically advantageous.

Further, in case of an object of common brightness, the front curtain 41 moves to the high reflection portion B at the center portion of the screen according to the running, so that an influence of the exposure correction value shown in FIG. 4b can be lessened by the high reflection portion B, thereby obtaining a good photographing effect by a proper exposure as in the above.

On the other hand, on the way of running the front curtain 41, if the brightness of an object is suddenly changed, the high reflection portion B is moved to the center portion of the screen by running the front curtain 41, so that the light measuring circuit can sensitively respond to a change of the brightness and an influence to the photographing effect by such change of the brightness can be suppressed at the least.

In addition, the present invention is not limited to the above embodiment but can be modified without departing from the scope of the invention. For instance, the pattern formed on the surface of the front curtain 41 of the shutter 4 can be arranged by differing the bandlike portion of a low reflection power shown by a hatched line. That is, the total reflection power of the center portion of the front curtain 41 is lowered and the total reflection power of at least the rear end portion is raised against the running direction.

As described above, according to the present invention, the exposure characteristic of the TTL reflection metering is improved, so that by employing the TTL reflection metering system, there can be proposed a camera for obtaining an excellent photographing effect even in a case of an object of high brightness by making an over-exposure as compared with an object of low brightness.

What is claimed is:

1. In a camera comprising a focal-plane shutter having a front curtain and a rear curtain for measuring reflected light from the front curtain surface to determine a proper exposure, the improvement wherein the front curtain has a center portion thereof formed into a low reflection portion for measuring reflected light with the start of the front curtain and a rear end portion being at least formed into a high reflection portion as compared with the center portion in the running direction of the front curtain means for delaying, running of said rear curtain until the measured light reaches a predetermined integral value to control contrast.

2. A camera as claimed in claim 1, including a light receiving element positioned to receive and measure light from the front curtain.

3. A camera as claimed in claim 2 including means to run the rear curtain when the measured light from the front curtain reaches a predetermined value.

4. A camera as claimed in claim 2 in which light incident upon the front curtain forms a random number pattern.

5. A camera as claimed in claim 4 in which the random number pattern forms a block point of low reflection power at the center portion of the front curtain.

6. A camera as claimed in claim 4 in which the random number pattern forms a high reflection portion as compared with the center portion at the left rear portion of the front curtain.

7. A camera with improved contrast control comprising a lens, a light receiving surface for forming an image of scene, a focal plane shutter between the lens and light receiving surface, said focal plane shutter comprising a running front curtain and a runnming rear curtain, a light receiving element positioned to receive and measure light reflected by the front curtain, said front curtain having a center portion of low reflectance for measuring the reflected light from the front curtain, and a rear end portion of higher reflectance than said center portion, and means to delay movement of said rear curtain until said measured light reaches a predetermined integral value to obtain an image with proper contrasts.

* * * * *

UNITED STATES PATENT OFFICE
CERTIFICATE OF CORRECTION

Patent No. 4,392,728     Dated July 12, 1983

Inventor(s) MUNEAKI YOSHIDA

It is certified that error appears in the above-identified patent and that said Letters Patent are hereby corrected as shown below:

Col. 4, line 4, after "curtain" insert --, and --; after "delaying" delete the comma "(,)"

Signed and Sealed this

Thirtieth Day of August 1983

[SEAL]

Attest:

GERALD J. MOSSINGHOFF

Attesting Officer     Commissioner of Patents and Trademarks